Patented July 14, 1942

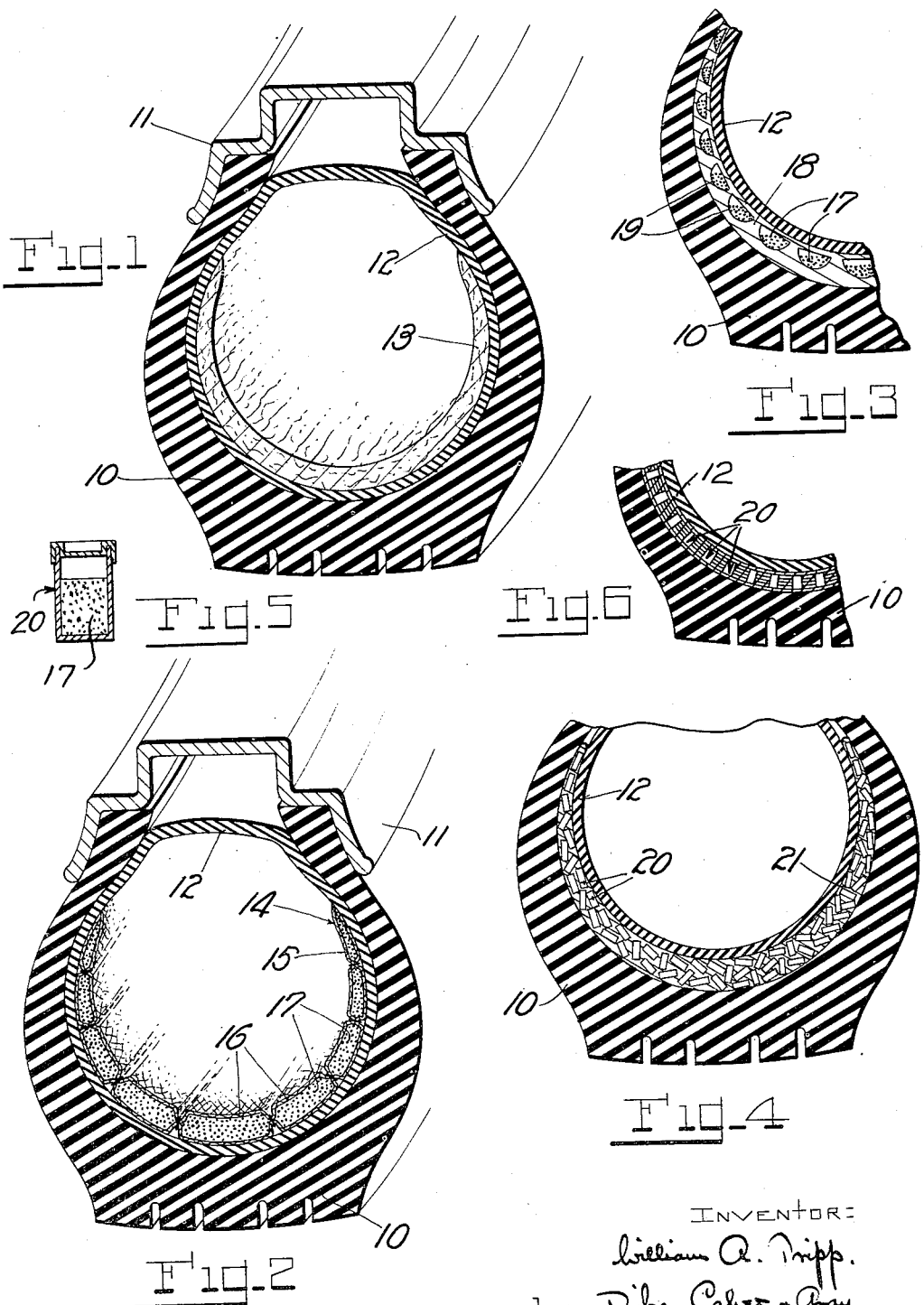

2,290,121

UNITED STATES PATENT OFFICE 2,290,121

VEHICLE TIRE

William A. Tripp, Medford, Mass.

Application June 3, 1939, Serial No. 277,187

11 Claims. (Cl. 152—330)

In operating vehicles upon roadways considerable annoyance has been experienced by reason of noises developed in the pneumatic or equivalent tires and transmitted to the occupants of the vehicle, either through the air or through the vehicle structure. These noises are caused by tire vibration set up by the impact of the tire on the road and are particularly bothersome in the operation of motor vehicles because of the higher speeds used and the resultant greater impact. On a smooth road surface this impact consists of the striking upon the road surface of the tread elements usually employed for skid-preventing purposes. On a rough road surface, such as coarse macadam and similar materials, or even a uniform material unevenly laid, the impact of a smooth tire, such as a tire on which the tread has been worn away, consists of the striking of the tire upon the individual portions of the road surface. When a new tire having the usual tread elements is used on such rough road surfaces, both impact actions are present, that is, the striking of the tread elements upon the road surface and the striking of the tire upon the individual portions of the road surface.

The object of my invention is to substantially eliminate these bothersome vibrations and noises resulting from tire impact by incorporating in the tire assembly suitable materials so disposed and of such a character as to absorb and dissipate the energy of tire impact without appreciably reducing the resiliency and other desirable riding qualities of the tire. Another desirable result obtained is the reduction of tire screech due to the sudden hard application of the brakes or taking curves at high speed, as the energy dissipating elements are just as effective in this case as they are in the case of tire impact, as will appear from the description of my invention, although this description has been directed primarily to its application to tire impact.

Impact is always accompanied by the transformation or transference of energy, or both. The amount of energy involved can be measured or computed by known methods, being proportional to the product of the mass and square of the change in velocity involved. In the case of tire impact the energy is partly transformed directly into heat, partly transferred to the road bed as kinetic energy of movement or vibration, partly transferred directly to the air as concussion, and the remainder is transferred from the tire tread elements or surface bearing on the road surface (the actual impacting part or parts) to the whole tire. The amounts transformed into heat and transferred directly to the air as concussion are small. The amount transferred to a hard road surface is also small. The truth of these statements is proven by the very great reduction in the amount of noise produced when the tire rides over a soft road bed, such as dirt, wherein the great proportion of the impact is absorbed by the material of the road bed in random movement and dissipated in the form of heat, the lowest level of energy and the form to which all energy is eventually transformed.

Thus, when the road is hard, the great proportion of the energy of impact appears in the fourth form mentioned above; that is, it is transferred from the portion contacting the road to the whole tire. The ordinary pneumatic tire is close to being an ideal instrument for picking up this energy. Being of a hollow design, blown up tightly by air pressure, it is, in effect, a sounding board or drum. All parts of the tire not in contact with the road, more especially the side walls, since they are of a relatively thin and uniform construction, readily respond to the impact and vibrate under its influence. The vibration of these large parts is partly transmitted to the air and eventually heard as sound, and partly transmitted to the vehicle structure and eventually communicated to the occupants either as direct vibration or as sound.

Experience teaches that "softness" is a means of reducing noise and vibration. As shown above this automatically occurs on soft roads, the impact energy being readily transformed into heat by the friction of the road material within itself as it moves under the impact. The object of my invention is accomplished by building the "softness" into the tire itself, by incorporating in its assembly a ballasting or loading charge of material so disposed and of such a character as to pick up the tire vibrations in their inception and dissipate the energy thereof so as to prevent their development into sound or other objectionable manifestations. The vibration dampening material, which comprises portions relatively movable to absorb vibrations, may be of such a character as to do so by means of internal friction developed in the material itself, or by means of friction developed by relative movement of the portions or elements upon one another, or by means of the individual or independent vibrations of the several portions which, being of a random nature, are mutually interfering upon one another and thus destructive of the resultant effects.

I am aware that it has heretofore been proposed to interpose a layer of "soft" material, such as sponge rubber, felt, cork or the like between the inner tube and outer casing of a pneumatic tire for puncture resisting and similar purposes, but such a layer so positioned has little or no sound or vibration deadening effect for the reason that the internal air pressure causes the interposed material to be so tightly squeezed and compressed between the tube and casing as to confine or restrain its parts against the relative movement upon which, in accordance with my invention, the vibration absorbing or dampening effect depends. As distinguished from these, a tire constructed in accordance with my invention has incorporated therein a vibration dampening or absorbing material so disposed and of such a character that parts thereof are unrestrained against relative movement by the air pressure in the tire and therefore left free, by reason of such relative movement, to pick up and thereby dissipate the energy of the tire vibrations. Moreover such puncture resisting forms are usually so constructed as to seriously interfere with the resiliency of the tire.

I am also aware that so-called "silent" tires have been built with tread designs which are intended to break up the rhythmic impact of the tire upon the road, but such constructions likewise have little or no effect upon the amount of noise energy produced. The purpose of such designs is admittedly to make the resultant sound substantially without definite pitch, but no claim is made as to an actual reduction in the amount of energy. Such constructions, moreover, deal only with the relative and mutual design of the tread elements and have no control over the sound caused by a rough or uneven road surface, or of tire screech, whereas my invention will reduce the amount of vibration and sound caused by tire tread, road surface, tire screech, and the like.

The invention will best be understood from the following description of certain illustrative embodiments thereof shown in the accompanying drawing, these, however, having been chosen for purposes of exemplification merely, it being obvious that the invention, as defined by the claims hereunto appended, may be otherwise embodied without departure from the spirit and scope thereof.

In said drawing:

Figs. 1 and 2 are sectional perspective views illustrating alternative forms of the invention.

Figs. 3 and 4 are fragmentary sectional views illustrating further modifications.

Fig. 5 is an enlarged sectional view of one of the sound absorbing members employed in the construction shown in Fig. 4.

Fig. 6 is a fragmentary sectional view illustrating another modification of the invention.

In Fig. 1 is shown a pneumatic tire comprising an outer casing or shoe 10 attached to the usual rim 11 and enclosing an inner tube 12. Secured within the inner tube 12 is an inner lining or layer 13 of vibration dampening material extending about the tread and side wall portions thereof. This lining or layer may be composed of felt or the like, which material, although of a structure the elements or portions of which are more or less interconnected, will, when positioned as described entirely within the tire, permit free relative movement of such portions since, in this position, the air pressure upon the material is equalized at opposite sides and throughout the same so as not to restrain or interfere with such movement.

In the construction shown in Fig. 2, the inner layer or lining 14 comprises a container 15 of textile or equivalent air-permeable fabric quilted to provide pockets 16 containing segregated masses of loose granular material 17, such as sand. The pockets hold the granular material in properly distributed position about the assembly, preventing their collection or bunching in one locality, and the amount of material in each pocket is small enough to permit free and unrestrained relative movement of the individual granules, this not being interfered with by the air pressure which, due to the permeability of the fabric and the granular material, is equalized about and throughout the lining.

Where loose granular material is employed as a vibration dampening medium, it may be positioned elsewhere than within the interior of the tire if enclosed in such a manner as to prevent interference with the free relative movement of the granules by the internal air pressure. Thus, as shown in Fig. 3, there may be interposed between the casing 10 and tube 12 a liner or layer 18 of relatively stiff, but sufficiently elastic, rubber formed with cavities or pockets 19 enclosing masses of the granular material 17. The material of the layer 18 must be sufficiently rigid, and the amount of material 17 in each pocket 19 sufficiently small, to prevent compaction of the material to a degree which will interfere with the free relative movement of the granules by reason of the squeezing pressure exerted upon said layer between the casing and tube by the internal air pressure.

If the granular material is to be interposed between the casing and tube, the arrangement shown in Figs. 4 and 5 is convenient. In this construction there is provided a multiplicity of rigid, preferably metal, permanently closed capsules 20 each partly filled with, and enclosing a mass of, granular material 17. By "partly filled" is meant, that the amount of material, with respect to the capacity of the capsule, is insufficient to interfere with the free and unrestrained relative movement of the individual granules. The capsules 20 may conveniently be incorporated, enclosed or embedded in a fabric or rubber liner 21 (Fig. 4), or they may be incorporated in the fabric of the casing (Fig. 6) during the manufacture of the latter.

I claim:

1. A pneumatic tire having firmly secured to a vibrating part thereof a vibration dampener consisting of particles of a solid substance which are bound into a self-contained mass of a consistency that they relatively move and rub each other under the vibration impulses of the tire without segregating from said mass, whereby the ensuing friction dissipates energy of vibration.

2. A pneumatic tire having incorporated in its wall loose granular material and enclosing means therefor of such character as to permit free relative movement of the granules therein under the vibration impulses of the tire and prevent the migration of said granules about the tire.

3. A pneumatic tire having in the interior thereof an inner vibration dampening layer comprising a fabric quilted to form pockets, said pockets containing a loose granular material.

4. A pneumatic tire having incorporated in its wall means enclosing segregated masses of loose granular material, said enclosing means being of such a character and so disposed as to permit free relative movement of the individual granules in the several masses under the vibration impulses of the tire and prevent the migration of said granules about the tire.

5. A pneumatic tire having incorporated in its wall means enclosing segregated masses of loose granular material, said enclosing means being so arranged as to prevent the migration of the individual granules in said masses about the tire and being sufficiently rigid to permit free relative movement of said granules in the several masses under the vibration impulses of the tire.

6. A pneumatic tire comprising an inner tube, an outer casing, and intermediate means enclosing segregated masses of loose granular material, said enclosing means being sufficiently rigid to permit free relative movement of the individual granules in the several masses notwithstanding the squeezing pressure exerted thereon by the tube and casing due to the internal air pressure within the tire.

7. A pneumatic tire having incorporated therein rigid capsules each partly filled with a loose granular material.

8. A pneumatic tire comprising an inner tube, an outer casing, and an intermediate layer of rigid capsules each partly filled with a loose granular material.

9. A liner for pneumatic tires having portions containing segregated masses of loose granular material.

10. A liner for pneumatic tires having a plurality of pockets each containing a mass of loose granular material.

11. A liner for pneumatic tires containing a multiplicity of rigid capsules each partly filled with a loose granular material.

WILLIAM A. TRIPP.